Elmar Götz
Peter Boese
Inventors

By: Spencer & Kaye
Attorneys

United States Patent Office 3,351,746
Patented Nov. 7, 1967

3,351,746
PROGRAM CONTROL SYSTEM TO REGULATE TOOL SPEED
Elmar Gotz, Frankfurt-Gravenbruch, and Peter Boese, Neu Isenburg, Germany, assignors to Licentia Patent-Verwaltungs-G.m.b.H., Frankfurt am Main, Germany
Filed Feb. 28, 1963, Ser. No. 261,720
Claims priority, application Germany, Mar. 14, 1962, L 41,475
9 Claims. (Cl. 235—151.11)

The present invention relates to a numerical program control arrangement, especially to an arrangement for controlling machine tools. Such arrangements have control systems which control the position of the work tool relative to the work piece, of vice versa, and it is the object of the present invention to enable such a system to control not only the position of the work tool, but also the rate of change of position, i.e., the speed at which the tool moves. In this way, existing position control systems can be used for additionally controlling the speed.

Accordingly, the present invention resides in a numerical program control arrangement having a position control system, especially a system adapted for use with machine tools, in which the desired speed at which the tool is to move, hereinafter referred to as the nominal speed, is fed into the system, the true or actual speed of the tool being derived from the track of a coded scale. In a practical embodiment, the pulses derived from the track are counted by a counter which is periodically reset, the output of the counter being applied to a pulsable output storage device which controls a member that compares the actual and nominal speeds.

Additional objects and advantages of the present invention will become apparent upon consideration of the following description when taken in conjunction with the accompanying drawings in which.

Figure 1:
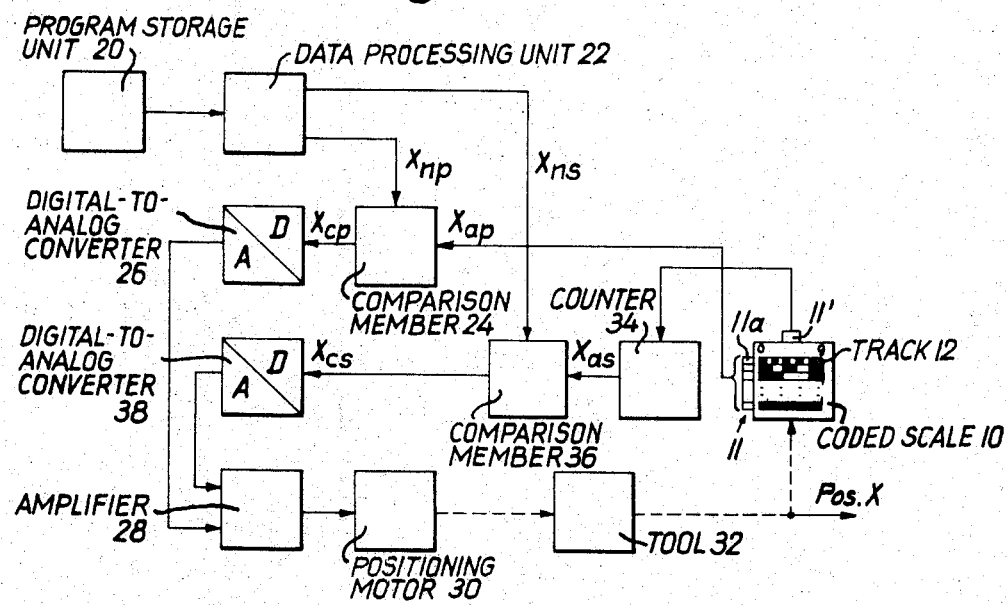
FIGURE 1 is a schematic diagram of a control system according to the present invention.

Referring now to the drawings and to FIGURE 1 thereof in particular, the same shows a coded scale 10 having a plurality of tracks, the lowest-order track, i.e., the one which is divided into the smallest subdivisions and hence having the largest number of subdivisions per unit length, being indicated at 12. It is this lowest-order track which is used for purposes of speed control. The coded scale itself is fixedly mounted on the frame of the machine, and is read off by means of photoelectric scanning devices which are carried by the part of the machine which carries the work tool, or vice versa, the important thing being that the scale extends in the direction of movement so that the relative movement between the scale and the scanning or read-out means is a replica of of the relative movement between the work tool and the work piece.

The control system comprises a program storage unit 20 whose output is applied to a data processing unit 22, at whose output, in turn, appear signals which indicate the nominal position and nominal speed of the work tool with respect to the work piece, it being hereinafter assumed, for purposes of explanation, that the work piece is carried by a stationary component and that the work tool is carried by a component which moves relative to the first-mentioned component carrying the work piece, although in practice the work piece may be movable and the work tool stationary. The output signals are referenced $X_{np}$ to represent the nominal values indicative of the position which the work tool is to occupy and $X_{ns}$ to represent the nominal values indicative of the speed at which the work tool is to move, at various stages of the machining process. In practice, these signals will, for ease of processing, be in binary form. The signals $X_{np}$ are applied to a first comparison member 24 which compares the nominal position with the actual position $X_{ap}$ of the tool which is obtained in conventional manner, by reading all of the tracks of the multipletrack scale 10 by means of a corresponding number of scanning devices 11. The comparison valve $X_{cp}$ put out by comparison member 24 is applied to a first digital-to-analog converter 26 whose output is applied, via amplifier 28, to a positioning motor 30. The latter is connected so as to move the work tool 32 in the direction X, which is the direction being considered. In this way, the work tool can be made to occupy any point along the direction X. The coded scale 10 is shown as being mechanically connected to the work tool 32 so as to be movable therewith in this direction X. In that case, the scanning devices will be carried by the stationary component.

The output signals obtained by a scanning device 11' which reads scanning track 12 are applied to a digital counter 34 whose output $X_{as}$, in turn, is applied to a second comparison member 36 which also has applied to it the output $X_{ns}$ representing the nominal speed. As will be explained below, the output $X_{as}$ of the digital counter 34 represents the actual speed of the tool 32 in the direction X. The output $X_{cs}$ is applied to a second digital-to-analog converter 38 whose output, in turn, is also applied to the amplifier 28, which as explained above, feeds the positioning motor 30.

Figure 2:
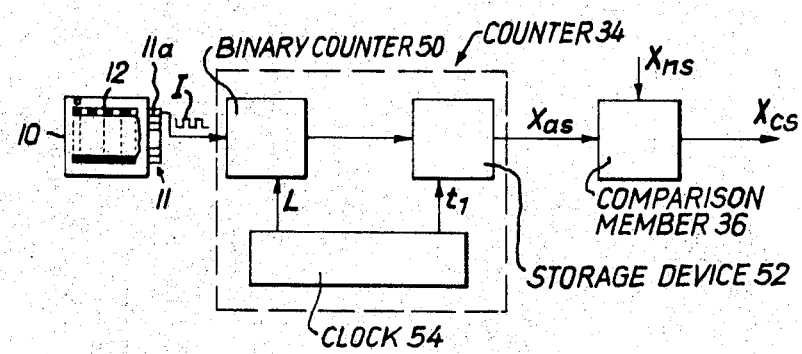
FIGURE 2 is a schematic diagram showing the details of one component of the control system of FIGURE 1.

FIGURE 2 shows the construction of the counter 34 and how it is used to produce a signal which is derived by scanning one of the tracks of the scale 10 and which represents the actual speed of the tool. The series of pulses I obtained by scanning track 12 are applied to a binary counter 50. In FIGURE 2, the pulses are shown as being derived not from a separate scanning unit 11', as was the case in the circuit of FIGURE 1, but from the particular scanning unit 11a which cooperates with the lowest-order track 12 having the smallest subdivisions. This scanning unit 11a will, of course, have to be provided in any case in order to obtain a value which is indicative of the actual position of the tool, so that, in this way, the circuitry for comparing the nominal and actual speeds does not require any scanning means above and beyond those that are already part of existing systems which do nothing other than compare the nominal and actual positions.

This counter is resettable in that it is so arranged as to be turned back to O every time a timing or clock pulse L is applied to it. This clock pulse may be timed to appear, for example, once every second. It will be appreciated that the result of this periodic counting operation will be a value which is proportional to the speed of the tool, i.e., the faster the tool travels, the greater will be the number of subdivisions of track 12 that are scanned during each second. It is for this reason that it is expedient to use the lowest-order scale having the most number of subdivisions per unit length of scale, because in this way more pulses per second will be obtained than would be the case if the scanning means used for this speed measurement were to scan a track having fewer subdivisions per unit length of the scale. Consequently, the accurary of the measurement will be higher.

Naturally, if the scale—and hence the tool—moves very slowly, there will be fewer pulses per second than if the scale and tool move more quickly. If the tool does not move at all, there will, of course, be no pulses at all.

In practice, the counter has a clock pulse applied to it once every second. The counter then begins to count the number of pulses I from that instant on until such time as the counter has an erase or reset pulse L applied to it, at which instant the counter is reset to O.

Before the counter is reset, however, the result of the counting operation is applied to a storage device 52. Thus, the counter is simply given a reset pulse L—which is of short duration—once a second, while the storage device 52 has a storage pulse $t_1$ applied to it at the appropriate instant so as to take up the result of the counting operation carried out by the counter, the clock for applying these pulses being indicated at 54. In this way, the value appearing at the output of the storage device 52 represents the actual speed of the tool; obviously, the value put out by counter 34 as a whole will be the value appearing at the output of storage device 52 so that whatever value is stored therein will be the value applied to the comparison member 36.

There now follows a numerical example: Let it be assumed that each pulse corresponds to a distance of 10 μm., this being the length of one of the divisions of the track 12. If there are ten such pulses per second, this means that the tool is displaced in the direction X at the rate of 10×10 μm. per second.

It will be remembered that the program applied from storage device 20 included commands relating to the position and speed of the tool. If, then, the difference between the position which the tool is supposed to occupy at any point during the operation and the position which the tool actually occupies, i.e., the difference between the nominal and actual values, is great, the difference between the nominal and actual speeds will dominate. If, thereafter, the actual position of the tool comes closer to the nominal position, the difference between the nominal and actual speeds will become less significant and the difference between the nominal and actual positions will now dominate. In this way, the over-all accuracy with which the tool follows its prescribed program will be substantially greater than if solely the difference between the nominal and actual positions were considered.

In practice, the system may be such that as soon as the difference between the nominal and actual speeds falls below a certain value—which will occur when the difference between the nominal and actual positions is no longer too great—a signal will be produced which deactivates so much of the circuit which carries out the speed comparison, i.e., components 34, 36 and 38.

Each of the above-described circuit elements is, at this stage of the development of the art, well known so that a detailed description of the various elements per se is unnecessary. In practice, each digital element will be sufficiently expanded to handle multiple-digit binary numbers.

It will be understood that the above description of the present invention is susceptible to various modifications, changes, and adaptations, and the same are intended to be comprehended within the meaning and range of equivalents of the appended claims.

What is claimed is:

1. In an arrangement for controlling the position which two parts occupy relative to each other, a system for controlling the speed at which one of the parts moves relative to the other, said system comprising, in combination:
   (a) means for supplying data representing the nominal speed of said one part;
   (b) means for deriving the actual speed of said one part, said last-mentioned means including a scale having a subdivided track extending in the direction of movement and means for scanning said track, said scale and scanning means being carried by said parts, respectively, said speed deriving means comprising means for counting the number of subdivisions scanned by said scanning means, means for periodically resetting said counting means, and storage means connected to the output of said counting means for storing the number of subdivisions counted by said counting means during each period;
   (c) means connected to receive the data from said means (a) and also connected to receive the output of said storage means of said means (b) for comparing the nominal and actual speeds; and
   (d) moving means responsive to said comparing means for moving said one part.

2. A system as defined in claim 1 wherein said means for periodically resetting said counting means comprise a clock, said clock being connected to said storage means for periodically pulsing the same to receive the result of the counting operation carried out by said counting means during each period.

3. A system for controlling the position which one of two parts occupies relative to the other, as well as for controlling the speed at which said one part moves relative to said other part, said system comprising, in combination:
   (a) means for supplying data representing the nominal position and the nominal speed of said one part;
   (b) means for deriving the actual position and the actual speed of said one part, said last-mentioned means including a scale having a plurality of subdivided tracks extending in the direction of movement and means for scanning said tracks, said scale and scanning means being carried by said parts, respectively, the output representing the actual position of said one part being derived from so much of the scanning means which scans all of said tracks and the output representing the actual speed of said one part being derived from only so much of said scanning means which scans but one of said tracks;
   (c) means for comparing the nominal and actual positions of said one part as well as the nominal and actual speeds of said one part; and
   (d) moving means responsive to said comparing means for moving said one part.

4. A system as defined in claim 3 wherein said means (b) comprise means for counting the number of subdivisions scanned by so much of said scanning means which scan only said one track, means for periodically resetting said counting means, and storage means connected to the output of said counting means for storing the number of subdivisions counted by said counting means during each period, the output of said storage means being applied to said comparing means.

5. A system as defined in claim 3 wherein said tracks have subdivisions of different lengths and wherein said one track is the track having the shortest individual subdivisions and hence the greatest number of subdivisions per unit length.

6. A system for controlling the position which one of two parts occupies relative to the other, as well as for controlling the speed at which said one part moves relative to said other part, said system comprising, in combination:
   (a) a coded scale having a plurality of subdivided tracks, each having subdivisions of different lengths, extending in the direction of relative movement and means for scanning said tracks, said scale and scanning means being carried by said parts, respectively;
   (b) means for supplying values representing the nominal position and the nominal speed of said one part;
   (c) first comparison means for comparing the value representing the nominal position obtained from said means (b) and the actual position of said one part as derived from so much of said scanning means which scans all of said tracks and producing an output representing the difference between said nominal and actual positions;
   (d) a first digital-to-analog converter connected to the output of said first comparison means for producing a control signal dependent on said difference between the nominal and actual positions;
   (e) means for obtaining from so much of said scanning means which scans but one of said tracks an output representing the actual speed of said one part;
   (f) second comparison means for comparing the value representing the nominal speed obtained from said means (b) and a value representing the actual speed of said one part as derived from said means (e) and for producing an output representing the difference between said nominal and actual speeds;

(g) a second digital-to-analog converter connected to the output of said second comparison means for producing a control signal dependent on said difference between the nominal and actual speeds; and (h) moving means responsive to the outputs of both of said converters for moving said one part.

7. A system as defined in claim 6 wherein said means (e) comprise:

(1) resettable counting means for counting the number of subdivisions of said one track;

(2) pulsable storage means connected to the output of said counting means for storing the number of subdivisions counted by said counting means;

(3) and a clock for periodically resetting said counting means and for periodically pulsing said storage means for causing the latter to receive the result of the counting operation carried out by said counting means during each period, (4) the output of said storage means constituting the output of said means (e) and hence being connected to said second comparison means.

8. A system as defined in claim 6 wherein said scanning means comprise a plurality of scanning devices, there being one scanning device for each respective track, the outputs of all of said scanning devices being a signal representing the actual position of said one part and the output of but a single scanning device scanning said one track being a series of pulses one for each subdivision scanned; said means (e) being connected to said output of said single scanning device and comprising means for counting the number of pulses produced thereby per unit time, thereby to give an indication of the actual speed of said one part.

9. A control system as defined in claim 6 wherein said parts are a component for carrying a work tool and a component for carrying a work piece, said components being part of a machine tool.

References Cited

UNITED STATES PATENTS

| | | | |
|---|---|---|---|
| 2,901,927 | 9/1959 | Morgan | 235—151.11 |
| 2,913,648 | 11/1959 | Brouwer | 235—151.11 |
| 2,944,737 | 7/1960 | Cail et al. | 235—151.11 |
| 3,099,781 | 7/1963 | Herchenroeder | 235—151.11 |

OTHER REFERENCES

"Numerical Control," Automation, August 1960, by McRainey and Miller pp. 77–85 relied on.

MALCOLM A. MORRISON, *Primary Examiner.*

MARTIN P. HARTMAN, *Examiner.*

A. J. SARLI, *Assistant Examiner.*